3,134,648
STABILIZED LIQUID OZONE
Stanley J. Chiras, Niagara Falls, N.Y., assignor to Olin Mathieson Chemical Corporation, a corporation of Virginia
No Drawing. Filed Jan. 30, 1958, Ser. No. 712,276
3 Claims. (Cl. 23—222)

This invention relates to liquid ozone which is stable under conditions of rapid evaporation.

Ozone, $O_3$, molecular weight 48, is an unstable blue gas with a pungent characteristic odor and is generally encountered in dilute form in admixture with air or oxygen. It has a melting point of $-191.1°$ C. and a boiling point of $-111.9°$ C. At $-111.9°$ C. ozone condenses to a dark blue liquid. Ozone is customarily handled as a gas or in admixture with liquid oxygen. It is used commercially in the purification of drinking water, as a powerful oxidant in both organic and inorganic reactions and in the treatment of industrial wastes. It is also used for the deodorization of air and sewage gases as well as for the preservation of foods in cold storage. More recently, liquefied ozone has found utility as an oxidant with rocket fuel. (See U.S. Patent 2,704,274 for a discussion in some detail of this use.) The handling of liquid ozone during its preparation, storage, shipment and use has presented new problems since it is easily exploded as are concentrated ozone-oxygen mixtures (above about 15 weight percent ozone), in either the liquid or vapor state. These explosions may be initiated by minute amounts of catalysts or organic matter, shock, electric spark or sudden changes in temperature, pressure, etc. For examples, any hot spots in lines, valves, etc., in a liquid ozone handling system or any leaks in such a system could cause rapid evaporation of the liquid ozone resulting in an explosion.

It has now been found that liquid ozone can be rendered stable with respect to initiation of an explosion under rapid evaporation conditions by incorporating isocyanatodifluorophosphate (isocyanatophosphoric acid difluoride) therein. The amount of isocyanatodifluorophosphate added to the ozone can vary widely but generally is from about 0.5 to 25 weight percent based on the ozone and preferably 15 to 25 weight percent.

In order to evaluate the stability of the liquid ozone compositions of this invention a test procedure was devised which is as follows: A standard vacuum line is used to condense, concentrate and supply ozone for the test. A 10 mm. Pyrex tube, about 6 inches long and sealed off at the bottom, is attached to the line after evacuation and ozone is vaporized from a storage trap and condensed into the test tube which is cooled in a liquid oxygen bath. The ozone is purified by evacuation to remove any oxygen resulting from decomposition during transfer. After adding nitrogen gas to the tube up to atmospheric pressure, it is manually removed from the oxygen bath and quickly placed in a water bath. The temperature of the latter determines the rate of boiling and is the criterion which determines effectiveness. Two types of results, upon immersion of the tube into the water bath, have been observed: an explosion, with shattering of the tube, or a rapid boiling with no attendant explosion. This test procedure was employed in the following examples:

Example I 3 grams of ozone were condensed into the tube maintained at $-183°$ C. by the liquid oxygen bath. The liquid ozone was purified by evacuation of the tube to remove any oxygen and the tube was pressured to atmospheric presure with nitrogen. The tube was manually removed from the liquid oxygen bath and quickly placed in an ice-slush bath (0° C.) The tube exploded violently.

Example II

The isocyanatodifluorophosphate

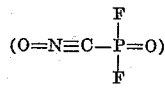

employed in this experiment was prepared by mixing isocyanatophosphoric acid dichloride (32 g., 0.2 mole) with 52 g. of finely ground argentous fluoride. The operation was conducted in an externally cooled, 250 ml., two-necked flask fitted with a reflux condenser and a trap cooled to $-80°$ C. The reaction mixture was allowed to warm to room temperature. A spontaneous reaction occurred. After the reaction subsided, the mixture was heated (at reflux) for three hours. The liquid reaction product (6 g.), B.P. 69–80° C., was recovered by distillation at atmospheric pressure. Unreacted dichloride (13.4 g.) B.P. 135° C., was also recovered. The dichloride was then allowed to react with 22 g. of argentous fluoride and 4 g. of material, B.P. 69–80° C., was recovered. Both fractions which boiled at 69–80° C. were combined and heated at the reflux temperature in the presence of 1.5 g. of argentous fluoride. Fractionation gave a portion which distilled at 69–73° C. The material was heated at reflux in the presence of 5 g. of lead fluoride. Phosphorous oxychlorofluoride was removed by this treatment. Isocyanatodifluorophosphate (5 g.), B.P. 69–71° C., was recovered by the final distillation.

0.06 gram of this isocyanatodifluorophosphate was placed in the tube and the tube was cooled to $-183°$ C. by immersion in a liquid oxygen bath. Ozone 0.3 gram, was then condensed on top of the isocyanatodifluorophosphate. After the tube was brought to atmospheric pressure by the addition of nitrogen gas, it was manually removed from the oxygen bath and quickly placed in a beaker containing an ice-slush bath (0° C.). Upon immersion of the tube in the bath a rapid boiling of the ozone occurred with no explosion. It is apparent from this example that isocyanatodifluorophosphate is effective in preventing an explosion when ozone is vigorously boiled.

The procedure of Example II was repeated twice using a water bath maintained at 50° C. Upon immersion of the tube in the water in each instance a rapid boiling of the ozone occurred with no explosion.

I claim:

1. A liquid ozone composition consisting essentially of liquid ozone having incorporated therein isocyanatodifluorophosphate

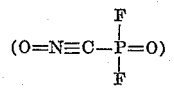

in an amount effective to stabilize the liquid ozone with respect to initiation of an explosion under rapid evaporation conditions.

2. A liquid ozone composition consisting essentially of liquid ozone and about 0.5 to 25 weight percent based on the ozone of isocyanatodifluorophosphate

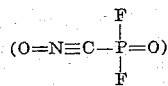

3. A liquid ozone composition consisting essentially of liquid ozone and about 15 to 25 weight percent based on the ozone of isocyanatodifluorophosphate

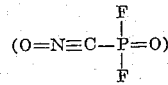

References Cited in the file of this patent

UNITED STATES PATENTS

| | | |
|---|---|---|
| 2,700,648 | Thorp et al. | Jan. 25, 1955 |
| 2,704,274 | Allison | Mar. 15, 1955 |

OTHER REFERENCES

Thorp: "Bibliography of Ozone Technology," vol. 2, pages 30–47 (1955).

Cook: "Ind. and Eng. Chem.," vol. 48, No. 4 pages 736–741, April 1956.